Dec. 28, 1948. C. SENN 2,457,606
WELDING GUN
Filed May 3, 1948
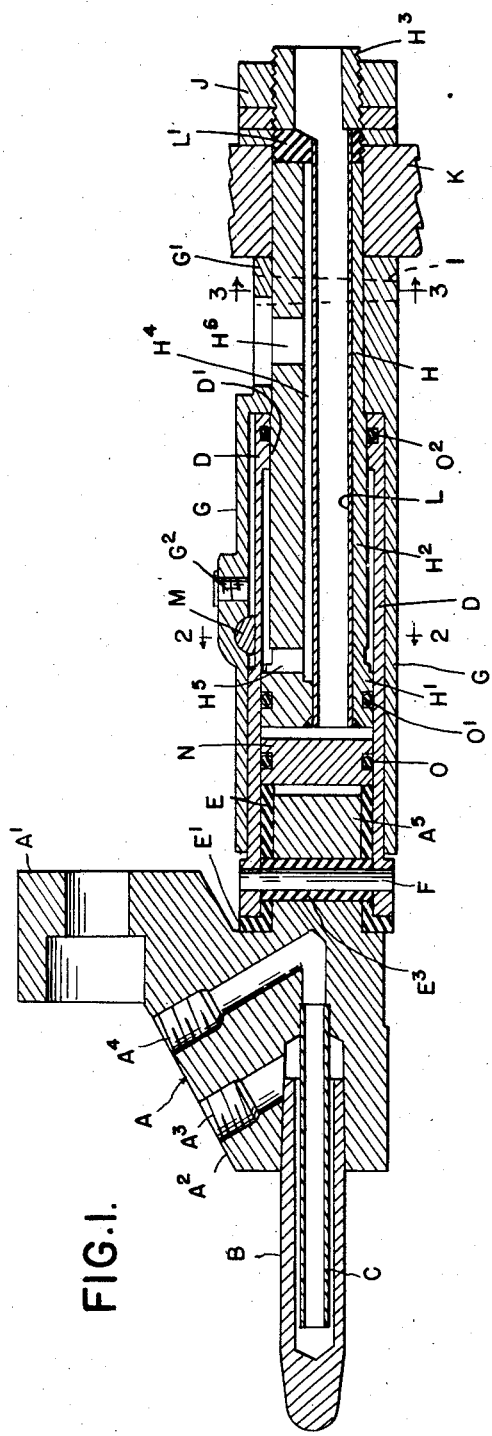
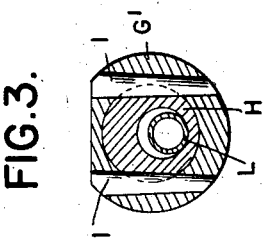
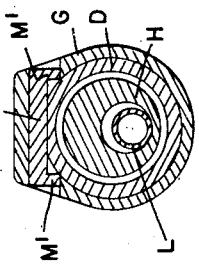
INVENTOR.
CHARLES SENN
BY
ATTORNEYS Patented Dec. 28, 1948

2,457,606

UNITED STATES PATENT OFFICE 2,457,606

WELDING GUN

Charles Senn, Detroit, Mich.

Application May 3, 1948, Serial No. 24,742

4 Claims. (Cl. 219—4)

1

The invention relates to welding guns and has for its object the obtaining of a simple construction which may be used singly or in multiple, and in which the electrode is alternatively pressed against the work or retracted therefrom by fluid pressure.

It is a further object to obtain a construction in which the movable elements of the gun are firmly held by the stationary elements thereof, while still providing for the required relative movement thereof.

Still further it is an object of the invention to obtain a construction provided with an electrified head for carrying the electrode and to which it is detachably secured, said head having also incorporated therein cooling means for itself and the electrode shank. With these and other objects in view, the invention consists in the construction as hereinafter set forth.

In the drawings:

Fig. 1 is a central, longitudinal section through the welding gun;

Fig. 2 is a cross-section on line 2—2, Fig. 1; and

Fig. 3 is a cross-section on line 3—3, Fig. 1.

A is a head to which the electrode B is secured preferably by providing the latter with a tapered shank engaging a corresponding socket in the head. This head has projecting portion A' for attachment of the cable which electrifies the head and electrode. Between the portion A' and the electrode is an oblique portion $A^2$ in which are formed parallel passages $A^3$ and $A^4$ for a liquid cooling system. The passage $A^3$ directly connects with the recess which receives the shank of the electrode, said shank being hollow for a portion of its length. The other passage $A^4$ connects with a small diameter tube C which extends outward from the head and into the space within said electrode to near the outer end thereof. Thus when the passages $A^3$ and $A^4$ are coupled to external flexible conduits (not shown) cooling fluid will be circulated through both the head and electrode shank.

The head A has secured thereto to extend rearward therefrom a cylinder D which, however, is electrically insulated from said head. This is accomplished by providing the head with a shank portion $A^5$, which is smaller than the bore of the cylinder and extends into the outer end portion thereof. An insulator bushing E is between the shank and the cylinder and is provided with an outwardly extending flange E' for separating the end of the cylinder from the head. These parts are secured to each other by a key such as a

2 tapered pin F which passes diametrically through the cylinder and a bore in said shank, said bore being lined by an insulator sleeve $E^3$. Thus the head and cylinder will be firmly connected to, but electrically insulated from, each other. The cylinder D is surrounded by a casing member G, and there is also a member H extending within the cylinder and having a piston head H' at its outer end for fitting the cylinder bore. In rear of said piston head is a cylindrical shank portion $H^2$ which is of slightly smaller diameter and which fits a smaller diameter bore D' at the rear end of the cylinder D. The casing G is also provided with a rear portion G' which fits the shank H and is connected thereto by one or more keys I. The shank extends out and beyond the portion G' of the casing and terminates in a threaded portion $H^3$ engaged by a nut J for clamping the structure to a suitable support K. The shank portion $H^2$ of the member H has a longitudinal bore $H^4$ therein connecting with the transverse bores $H^5$ and $H^6$, which together form a passageway connecting to the space between the shank and the cylinder on the rear side of the piston head. A tube L of smaller diameter than the bore $H^4$ passes through the same and through the piston head H' connecting with the latter. The rear end of this tube engages a plug L' which separates it from the bore $H^4$ but connects it with a passage through the end of the shank $H^2$. The plug L' is brazed or welded to the shank $H^2$ and the threaded portion $H^3$ to form thereof a rigid structure. The passage through the end of the shank is connected by a conduit (not shown) to the source of fluid under pressure and another fluid conduit (also not shown) is connected to the bore $H^6$. To prevent relative rotation of the casing G and cylinder D, the latter is provided with a flattened portion extending for a portion of its length, and a key M passing through a transverse bore in the casing has a flattened central portion which engages the flattened portion of the cylinder D, while heads M' at its opposite ends hold the key from disengagement. A piston N is placed within the cylinder between the piston head H' and the bushing E and a packing ring O forms a peripheral seal for said piston. Similar packing rings O' and $O^2$ seal, respectively, the piston head H' and the portion of said cylinder which engages the shank $H^2$.

The parts being constructed as above described are assembled as follows. The member H is first inserted into the large end of the cylinder D passing therethrough and out through the smaller diameter bore D'. Both of these parts are then inserted through the large end of the casing G and the shank H² passes on through the small diameter portion G' of said casing. The casing and shank are then secured to each other by the pins I. The head A has the insulator bushing E placed around the shank A⁵ thereof, both being inserted within the large end of the cylinder D. But before so inserting these parts, the piston N is placed within said cylinder. The key F is then engaged with the registering cross bores in said cylinder and the portion A⁵, the latter being first provided with the insulator sleeve E³. This will lock the cylinder D to the head A but will electrically insulate the one from the other. The key M is inserted into the cross bore in the casing G before the cylinder D, is engaged with said casing and will hold these parts against any relative rotation while permitting free longitudinal movement thereof. Oil can be introduced through a port G² in the casing G to lubricate the contacting surfaces of the cylinder and the casing. The gun may then be mounted upon a support K varying according to the particular purpose for which the gun is to be used and the nut J clamps the end of the housing G against such support. In operation the fluid pressure entering the port in the end of the shank H² and passing through the tube L will flow between the pistons N and H', thereby causing the outward movement of the cylinder D and the pressing of the electrode B against the work. On the other hand, fluid pressure entering the port H⁶ and passing through the bore H⁴ and passage H⁵ will flow into the chamber between the shank H² and the cylinder and will move the latter in a rearward direction. This is due to the differential area of the shank H² and piston head H', which will be sufficient to retract the cylinder. A greater pressure will be applied to move the cylinder outward than to retract the electrode from the work.

What I claim as my invention is:

1. A welding gun comprising a head having an electrode secured to and projecting therefrom and a shank projecting oppositely from said electrode, a cylinder secured to said shank and electrically insulated therefrom, the rear end of said cylinder having a bore of slightly smaller diameter, an external casing receiving and fitting said cylinder and having at its rear end a portion with a bore corresponding to the small diameter bore of said cylinder, a member within said cylinder having a piston head fitting the same and a rearwardly extending cylindrical shank fitting the small bore of said cylinder and casing and extending outward through the same being rigidly attached to said casing, said piston shank having longitudinally extending passages therein one extending through said piston head and the other connected to the space surrounding said piston shank, the opposite ends of said passages being adapted for connection with an independent source of fluid pressure, whereby pressure fluid entering the one will move said cylinder outward from said casing and press the electrode against the work while pressure fluid entering the other will retract said cylinder into said casing.

2. A welding gun comprising a head having an electrode secured to and projecting therefrom and a shank projecting oppositely from said electrode, a cylinder secured to said shank and electrically insulated therefrom, the rear end of said cylinder having a bore of slightly smaller diameter, an external casing receiving and fitting said cylinder and having at its rear end a portion with a bore corresponding to the small diameter bore of said cylinder, a member within said cylinder having a piston head fitting the same and a rearwardly extending cylindrical shank fitting the small bore of said cylinder and casing and extending outward through the same being rigidly attached to said casing, said piston shank having longitudinally extending passages therein one extending through said piston head and the other connected to the space surrounding said piston shank, the opposite ends of said passages being adapted for connection with an independent source of fluid pressure, whereby pressure fluid entering the one will move said cylinder outward from said casing and press the electrode against the work while pressure fluid entering the other will retract said cylinder into said casing, and engagement means between said casing and cylinder for preventing relative rotation thereof.

3. A welding gun comprising a head having an electrode secured to and projecting therefrom and a shank projecting oppositely from said electrode, a cylinder having a large diameter bore in its main portion and a slightly smaller diameter bore in its rear end portion, an insulator mounting for said cylinder on said shank including a bushing, a sleeve extending through a transverse bore in said shank and a pin extending through said cylinder, bushing and sleeve forming a rigid connection therebetween, an external casing receiving and fitting said cylinder and having at its rear end a portion with a bore corresponding to the small diameter bore of said cylinder, a member within said cylinder having a piston head fitting the same and a rearwardly extending cylindrical shank fitting the small bore of said cylinder and casing and extending outward through the same, means for rigidly connecting said casing and a piston shank, the latter having longitudinally extending passages therein, one extending through said piston head and the other connected with the space surrounding said piston shank, the opposite ends of said passages being adapted for connection with an independent source of fluid pressure, whereby pressure fluid passing through said piston head will move said cylinder outward from said casing and press said electrode against the work while pressure fluid entering the space surrounding said piston shank will retract said cylinder into said casing.

4. A welding gun comprising a head having an electrode receiving socket and a shank projecting oppositely from said socket, said head having fluid passages therein one connecting to said socket and the other extending into alignment with said socket, a hollow electrode engaging said socket, a tube extending from said head through said socket and into said electrode being connected at its rear end with said passage in alignment with said socket, a cylinder secured to said shank and electrically insulated therefrom, the rear end of said cylinder having a bore of slightly smaller diameter, an external casing receiving and fitting said cylinder and having at its rear end a portion with a bore corresponding to the small diameter bore of said cylinder, a member within said cylinder having a piston head fitting the same and a rearwardly extending cylindrical shank fitting the small bore of said cylinder and casing and extending outward through the same being rigidly attached to said casing, said piston shank having longitudinally extending passages therein one extending through said piston head and the other connected to the space surrounding said piston shank, the opposite ends of said passages being adapted for connection with an independent source of fluid pressure, whereby pressure fluid entering the one will move said cylinder outward from said casing and press the electrode against the work while pressure fluid entering the other will retract said cylinder into said casing.

CHARLES SENN.

REFERENCES CITED

The following references are of record in the file of this patent:

UNITED STATES PATENTS

| Number | Name | Date |
|---|---|---|
| 2,256,028 | Jardine | Sept. 16, 1941 |
| 2,341,133 | Weightman | Feb. 8, 1944 |

FOREIGN PATENTS

| Number | Country | Date |
|---|---|---|
| 782,691 | France | Mar. 25, 1935 |